(12) United States Patent
Nomura et al.

(10) Patent No.: US 8,264,108 B2
(45) Date of Patent: Sep. 11, 2012

(54) BRUSHLESS MOTOR

(75) Inventors: Masashi Nomura, Kyoto (JP); Yukinobu Shiraishi, Kyoto (JP)

(73) Assignee: Nidec Corporation, Kyoto (JP)

( * ) Notice: Subject to any disclaimer, the term of this patent is extended or adjusted under 35 U.S.C. 154(b) by 259 days.

(21) Appl. No.: 12/828,632

(22) Filed: Jul. 1, 2010

(65) Prior Publication Data
US 2011/0006634 A1 Jan. 13, 2011

(30) Foreign Application Priority Data
Jul. 9, 2009 (JP) ................... 2009-162855

(51) Int. Cl.
H02K 5/167 (2006.01)
H02K 1/18 (2006.01)

(52) U.S. Cl. ........ 310/67 R; 310/216.015; 310/216.016; 360/99.08

(58) Field of Classification Search ............... 310/67 R, 310/216.004, 216.015–216.016, 216.019, 310/216.055, 216.111; 360/97.2, 98.07, 360/98.08, 99.04, 99.05, 99.08–99.12
See application file for complete search history.

(56) References Cited

U.S. PATENT DOCUMENTS

| 6,455,961 | B1 * | 9/2002 | Higuchi | 310/67 R |
| 6,617,736 | B1 * | 9/2003 | Horng et al. | 310/91 |
| 6,936,940 | B2 * | 8/2005 | Kobayashi et al. | 310/67 R |
| 2004/0239198 | A1 * | 12/2004 | Horng et al. | 310/91 |
| 2006/0113854 | A1 | 6/2006 | Kadowaki et al. | |

FOREIGN PATENT DOCUMENTS

| JP | 08-186969 A | 7/1996 |
| JP | 11-187605 A | 7/1999 |
| JP | 2000-004554 A | 1/2000 |
| JP | 2000-209828 A | 7/2000 |
| JP | 2001-298893 A | 10/2001 |
| JP | 2004-072974 A | 3/2004 |
| JP | 2006-158013 A | 6/2006 |
| JP | 2006-158056 A | 6/2006 |
| JP | 2009-100573 A | 5/2009 |

* cited by examiner

Primary Examiner — Tran Nguyen
(74) Attorney, Agent, or Firm — Keating & Bennett, LLP (57) ABSTRACT

A stator includes an annular core back portion, a plurality of teeth extending radially outward from an outer circumference of the core back portion, and coils. A cylindrical portion of a housing includes a contact portion and a coming-off preventing portion arranged above the contact portion on an outer circumference of the cylindrical portion. The core back portion includes a small-diameter opening defining portion and a large-diameter opening defining portion arranged above the small-diameter opening defining portion. The cylindrical portion is arranged radially inward of the core back portion. The stator is held by the cylindrical portion with a lower surface of the core back portion arranged in contact with the contact portion and an upper surface of the small-diameter opening defining portion arranged in contact with the coming-off preventing portion. A bearing member is arranged radially inside the large-diameter opening defining portion and above the coming-off preventing portion.

6 Claims, 8 Drawing Sheets

BRUSHLESS MOTOR

BACKGROUND OF THE INVENTION

1. Field of the Invention

The present invention relates to a brushless motor.

2. Description of the Related Art

So-called outer-rotor brushless motors, in which a rotor magnet is arranged radially outward of a stator, are often used as a main motor for an office automation appliance, a motor for a blower, and the like.

The brushless motors of this type are required to perform reliably even under severe conditions. The main motor of an office automation appliance, for example, is often used for a long time under a high temperature environment. Therefore, the brushless motors of this type are required to withstand a heat shock test. In addition, the brushless motors of this type are required to have high reliability in load-carrying capacity and impact resistance. Use of large-diameter bearings is desirable for the brushless motors to achieve the aforementioned characteristics. Moreover, it is necessary to join components of the brushless motor to one another securely in order to prevent an application of an external force to the brushless motor from causing detachment of any component from the brushless motor.

For the above-described reasons, it is desirable to join the components to one another securely by a structural method, such as swaging or screwing, rather than through adhesion or other less robust securing methods.

Meanwhile, miniaturization of devices in which the brushless motors are installed requires a reduction in the size of the brushless motors as a whole.

The outside diameter of the brushless motor is influenced by the radial dimension of a rotor hub, the radial dimension of a rotor magnet, the radial dimension of teeth of a stator core, the radial dimension of a core back portion of the stator core, the radial dimension of a housing, and the outside diameter of bearings. Notice here that magnetic properties of the brushless motor will deteriorate if the radial dimension of the rotor hub, the radial dimension of the rotor magnet, and the radial dimension of the teeth of the stator core are decreased to reduce the diameter of the brushless motor.

SUMMARY OF THE INVENTION

A brushless motor according to a preferred embodiment of the present invention includes a shaft extending in a vertical direction along a rotation center axis, and arranged to rotate about the rotation center axis; a bearing member arranged to rotatably support the shaft; a rotor hub in a shape of a cup with a downward opening, and joined to the shaft; a rotor magnet arranged radially inside the rotor hub; a stator arranged radially inward of the rotor magnet and opposite the rotor magnet with a gap therebetween; and a housing including a cylindrical portion radially outside which the stator is positioned. The stator includes an annular core back portion, a plurality of teeth extending radially outward from an outer circumference of the core back portion, and coils each of which is defined by a conductor wire wound around a separate one of the teeth. The cylindrical portion preferably includes a contact portion and a coming-off preventing portion arranged above the contact portion on an outer circumference of the cylindrical portion. The core back portion preferably includes a small-diameter opening defining portion and a large-diameter opening defining portion arranged above the small-diameter opening defining portion. The cylindrical portion is arranged radially inward of the core back portion. The stator is preferably held by the cylindrical portion with a lower surface of the core back portion arranged in contact with the contact portion and an upper surface of the small-diameter opening defining portion arranged in contact with the coming-off preventing portion. The bearing member is arranged radially inside the large-diameter opening defining portion. The bearing member is arranged above the coming-off preventing portion.

A brushless motor according to another preferred embodiment of the present invention includes a shaft extending in a vertical direction along a rotation center axis, and arranged to rotate about the rotation center axis; a bearing member arranged to rotatably support the shaft; a rotor hub in a shape of a cup with a downward opening, and joined to the shaft; a rotor magnet arranged radially inside the rotor hub; a stator arranged radially inward of the rotor magnet and opposite the rotor magnet with a gap therebetween; and a housing including a cylindrical portion above which the stator is positioned. The stator preferably includes an annular core back portion, a plurality of teeth extending radially outward from an outer circumference of the core back portion, and coils each of which is preferably defined by a conductor wire wound around a separate one of the teeth. The cylindrical portion preferably includes a contact portion and a hole recessed axially downward from the contact portion on an upper surface of the cylindrical portion. The core back portion includes a small-diameter opening defining portion and a large-diameter opening defining portion arranged above the small-diameter opening defining portion. The small-diameter opening defining portion preferably includes a fastener insertion portion defined by an axial through hole or a radially outward recess on an inner circumferential surface of the small-diameter opening defining portion. The fastener insertion portion and the hole have a fastener (for example, a screw, a pin, etc.) inserted therein, the fastener including a fastener portion and a coming-off preventing portion having a greater diameter than that of the fastener portion. The stator is held with a lower surface of the core back portion arranged in contact with the contact portion and an upper surface of the small-diameter opening defining portion arranged in contact with the coming-off preventing portion. The bearing member is arranged above the coming-off preventing portion.

The brushless motors according to the preferred embodiments of the present invention are able to achieve a reduction in diameter, include a bearing with a relatively large diameter, and achieve joining of the housing and the stator by a structural method, without a reduction in magnetic properties.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
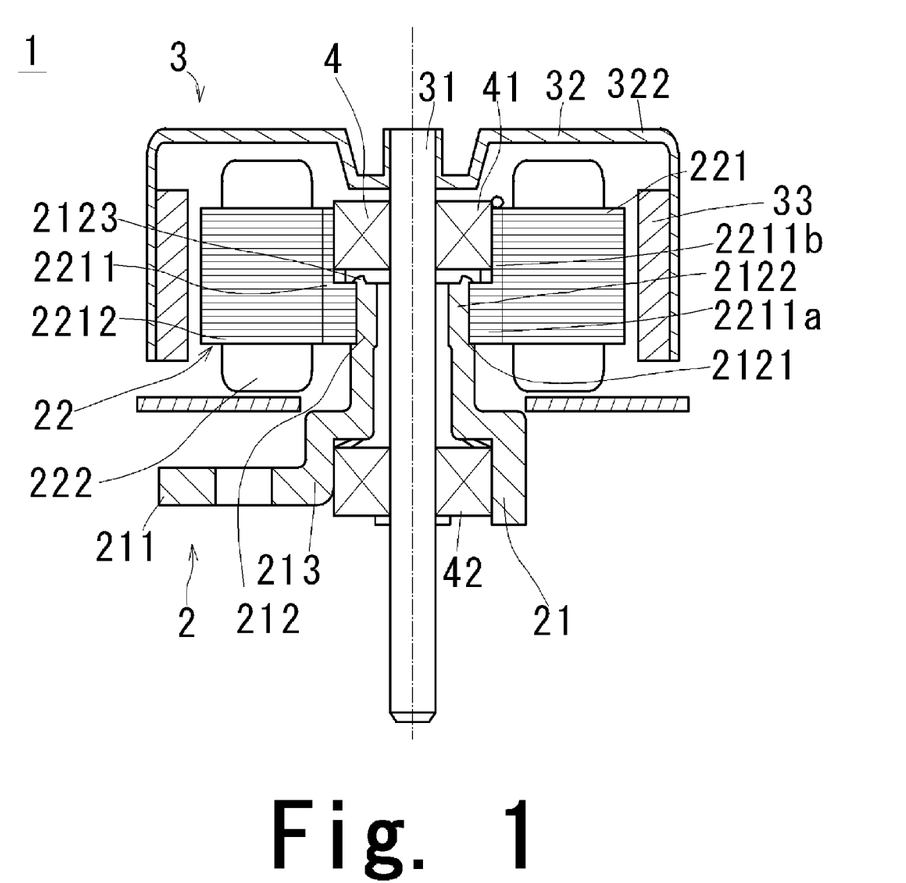
FIG. 1 is a cross-sectional view illustrating an overall structure of a brushless motor according to a preferred embodiment of the present invention.

Referring to FIG. 1, for example, it is assumed herein that the terms "upper", "upward", "above", etc., indicate a side on which a bottom portion 322 of a rotor hub 32 is located with respect to a cylindrical portion 212 of a housing, while the terms "lower", "downward", "below", etc., indicate a side on which an opening of the rotor hub 32 is located with respect to the bottom portion 322 of the rotor hub 32. A vertical direction of the accompanying drawings is generally in compliance with the above definitions of the terms "upper", "upward", "above", "lower", "downward", "below", etc. It should be noted, however, that these definitions of the terms are simply applied to facilitate the description provided herein, and should not be construed to restrict in any way the orientation of a brushless motor with respect to gravity according to any preferred embodiment of the present invention when actually installed in a device.

FIG. 1 is a cross-sectional view of an example of an overall structure of a brushless motor 1 according to a preferred embodiment of the present invention. Referring to FIG. 1, the housing 21 is preferably formed by shaping a galvanized sheet steel by press working, but any other desirable material and method could be used to create the housing 21. The housing 21 preferably has a substantially cylindrical shape. The housing 21 preferably includes a base portion 211 and a cylindrical portion 212 extending upward from the base portion 211. An accommodating portion 213 is arranged as an inside portion of the base portion 211 to accommodate a lower bearing member 42.

A stator 22 is arranged radially outside the cylindrical portion 212 of the housing 21. The stator 22 includes a stator core 221 and coils 222 wound on a plurality of teeth 2212 of the stator core 221. The stator core 221 is preferably defined by a lamination of thin ferromagnetic steel sheets, but any other desirable stator core could be used. The stator core 221 includes an annular core back portion 2211 and the teeth 2212 extending radially outward from the annular core back portion 2211. A conductor wire is wound around each of the teeth 2212 to define the coils 222. Portions of the stator core 221 around which the conductor wire is wound and their vicinities are coated with an insulating material.

An upper bearing member 41 (a portion of a bearing member 4) preferably includes an outer circumferential surface held on an inner circumferential surface of the core back portion 2211 of the stator core 221. The upper bearing member 41 is a ball bearing.

A shaft 31, which extends in the vertical direction along a rotation center axis and is arranged to rotate about the rotation center axis, is fixed to inner circumferential surfaces of the upper and lower bearing members 41 and 42. The shaft 31 is supported by the upper and lower bearing members 41 and 42 to be rotatable with respect to the housing 21. The shaft 31 is inserted inside the upper and lower bearing members 41 and 42, and preferably fixed thereto through, for example, an adhesive.

The rotor hub 32 is substantially in the shape of a cup, and fixed to the shaft 31 at a position higher than that at which the upper bearing member 41 is fixed to the shaft 31. The rotor hub 32 is fixed to the shaft 31 through, for example, adhesion or press fitting or a combination of adhesion and press fitting. An annular rotor magnet 33 is fixed to an inner circumferential surface of a tubular portion of the rotor hub 32. The stator 22 and an inner circumferential surface of the rotor magnet 33 are arranged radially opposite to each other with a gap provided therebetween. The rotor hub 32 and the rotor magnet 33 are fixed to each other through, for example, adhesion or press fitting or a combination of adhesion and press fitting.

The core back portion 2211 of the stator core 221 includes a small-diameter opening defining portion 2211a and a large-diameter opening defining portion 2211b. The large-diameter opening defining portion 2211b is positioned above the small-diameter opening defining portion 2211a, and has a greater inside diameter than that of the small-diameter opening defining portion 2211a.

The cylindrical portion 212 of the housing 21 includes a contact portion 2121, a stator opposing portion 2122 positioned above the contact portion 2121, and a coming-off preventing portion 2123 positioned above the stator opposing portion 2122.

The cylindrical portion 212 of the housing 21 is arranged radially inside the small-diameter opening defining portion 2211a. An inner circumferential surface of the small-diameter opening defining portion 2211a is preferably either arranged in contact with the cylindrical portion 212 of the housing 21 or arranged radially opposite the cylindrical portion 212 with a slight gap therebetween. The axial dimension of the small-diameter opening defining portion 2211a is substantially identical to the axial dimension of the stator opposing portion 2122 of the cylindrical portion 212.

At least a portion of an upper surface of the small-diameter opening defining portion 2211a is arranged in contact with the coming-off preventing portion 2123 of the housing 21 to prevent the stator core 221 from coming off axially upward. In addition, a lower surface of the core back portion 2211 of the stator core 221 is arranged in contact with the contact portion 2121 of the housing 21. The stator 22 is thus held between the coming-off preventing portion 2123 and the contact portion 2121 of the cylindrical portion 212.

An inner circumferential surface of the large-diameter opening defining portion 2211b is arranged to hold the outer circumferential surface of the upper bearing member 41. Specifically, the upper bearing member 41 is inserted inside the large-diameter opening defining portion 2211b, and fixed thereto through an adhesive. Notice here that there is no need to arrange a portion of the housing 21 between the stator 22 and the upper bearing member 41, which makes it possible to secure an additional radial space for the upper bearing member 41 in place of this portion of the housing 21. This in turn enables use of a bearing member of a relatively large outside diameter as the upper bearing member 41, without the need to decrease the radial dimension of the teeth 2212 of the stator core 221.

As a result of the above-described structure, the brushless motor 1 according to the present preferred embodiment of the present invention is able to achieve a reduction in diameter, include a bearing with a relatively large diameter, and achieve joining of the housing 21 and the stator 22 by a structural method, without a reduction in magnetic properties.

Figure 2:
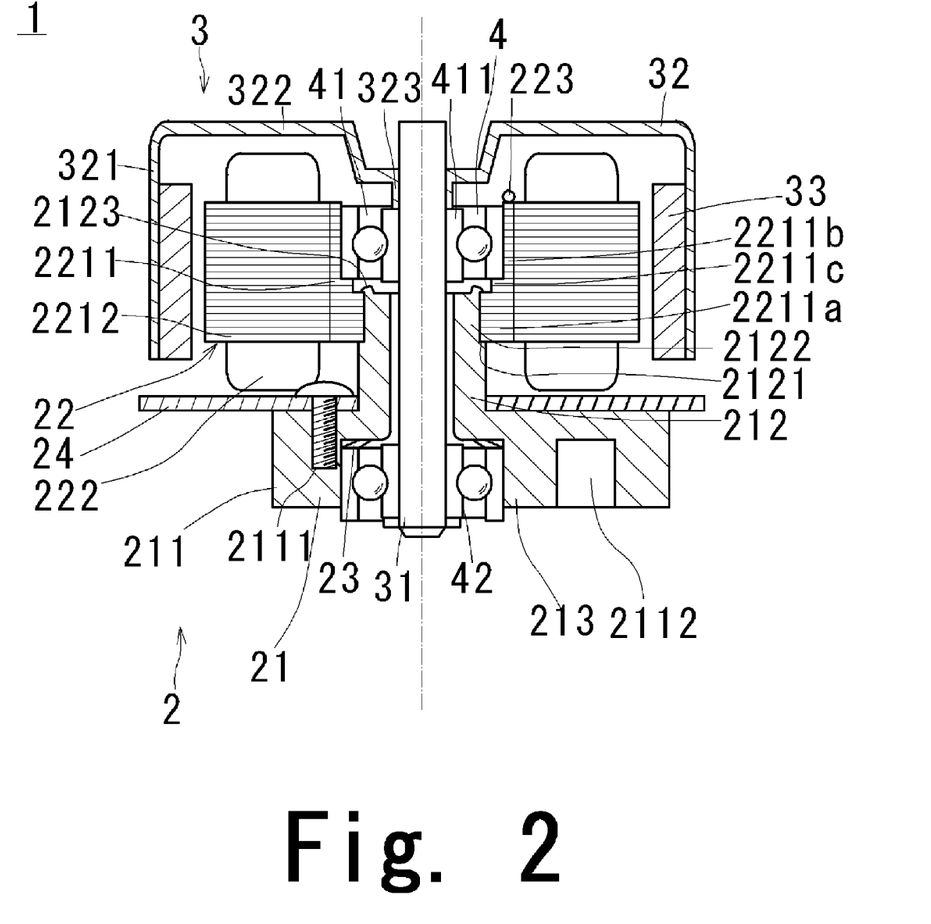
FIG. 2 is a cross-sectional view illustrating an overall structure of a brushless motor according to another preferred embodiment of the present invention.

FIG. 2 is a cross-sectional view of an example of an overall structure of a brushless motor 1 according to another preferred embodiment of the present invention. Referring to FIG. 2, the brushless motor 1 includes a rotating portion 3, a stationary portion 2, and a bearing member 4. The rotating portion 3 includes a shaft 31, a rotor hub 32, and a rotor magnet 33. The stationary portion 2 preferably includes a housing 21, a stator 22, and a circuit board 24. The bearing member 4 includes an upper bearing member 41 and a lower bearing member 42. The upper bearing member 41 is held by the stator 22, whereas the lower bearing member 42 is held by the housing 21.

The housing 21 as a whole is substantially cylindrical. The housing 21 includes a base portion 211 and a cylindrical portion 212 extending upward from the base portion 211. The housing 21 is preferably die cast of a zinc alloy, but any other material and manufacturing process can be used to make the housing 21 if so desired. An inner circumferential surface of the base portion 211 has a circular cross-section taken along a plane perpendicular or substantially perpendicular to the rotation center axis. The base portion 211 includes an accommodating portion 213 arranged to accommodate the lower bearing member 42.

The lower bearing member 42 is preferably a ball bearing, and is inserted inside the accommodating portion 213 of the housing 21 and preferably fixed to an inside surface of the accommodating portion 213 through, for example, an adhesive. A preload spring 23 is preferably arranged between the housing 21 and an upper surface of the lower bearing member 42 to apply a preload to the bearing member.

The cylindrical portion 212 of the housing 21 includes a contact portion 2121 having a radially expanding surface, a stator opposing portion 2122 extending axially upward from a radially innermost portion of the contact portion 2121, and a coming-off preventing portion 2123 positioned above the stator opposing portion 2122.

The stator 22 is held radially outside the cylindrical portion 212 of the housing 21. The stator 22 includes a stator core 221 and coils 222 defined by conductor wires wound around teeth 2212 of the stator core 221. The stator core 221 is preferably defined by a lamination of thin ferromagnetic steel sheets, but any other desirable stator core could be used. The laminated steel sheets are preferably fixed to one another through a swaging process, but any other desirable fixing method could be used. The stator core 221 includes an annular core back portion 2211 and the teeth 2212 extending radially outward from the annular core back portion 2211. In the present preferred embodiment, the number of teeth 2212 is preferably six, for example, and the teeth 2212 are arranged at regular intervals in a circumferential direction. The conductor wire is wound around each of the teeth 2212 to define the coils 222. Portions of the stator core 221 around which the conductor wire is wound and their vicinities are coated with an insulating material.

Figure 4:
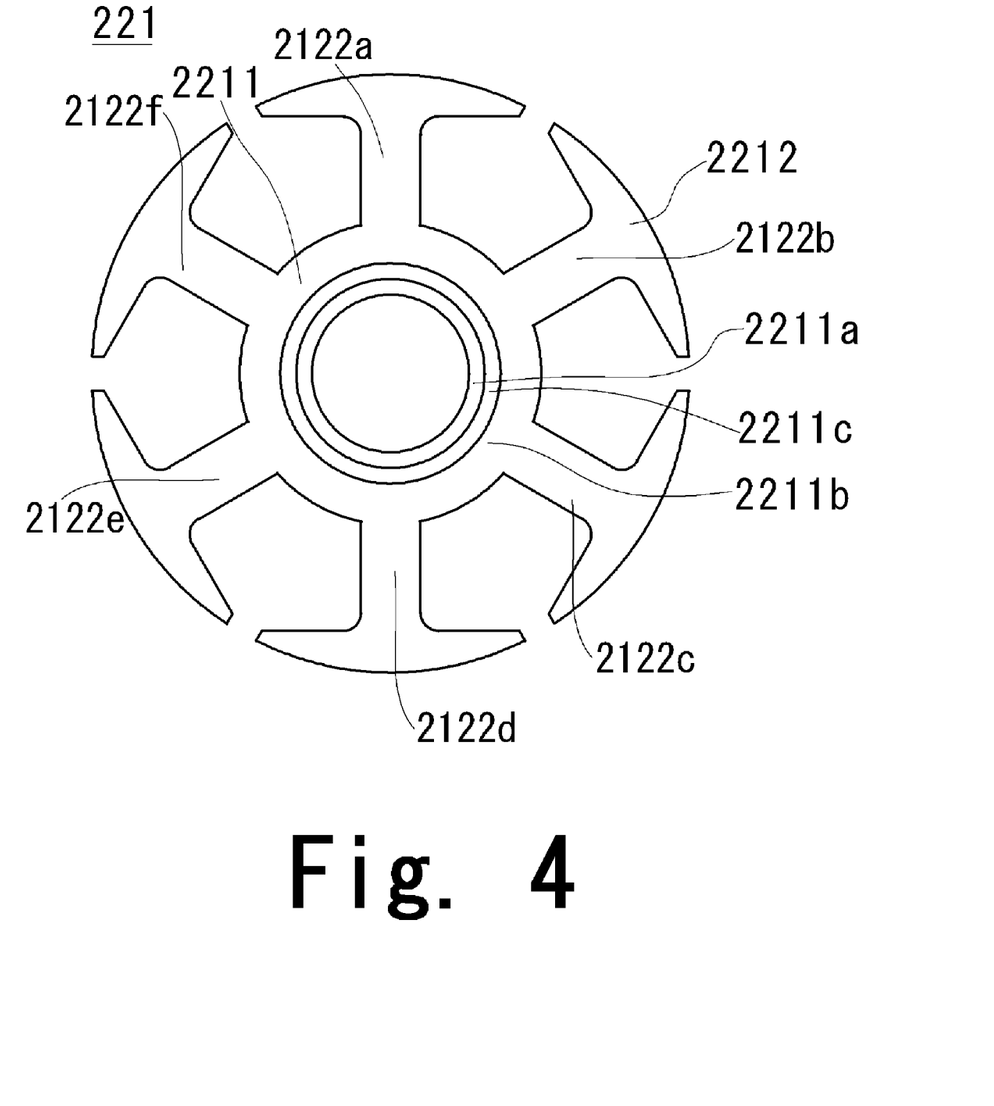
FIG. 4 is a plan view of a stator core of the brushless motor illustrated in FIG. 2.

The brushless motor 1 according to the present preferred embodiment has a three-phase drive system, in which U, V, and W phases are connected in a star configuration with one end of each of the phases connected to a neutral point. Accordingly, since the number of teeth 2212 is preferably six in the present preferred embodiment, two teeth 2212 for each phase are continuously wound with the conductor wire. Suppose, for example, that six individual teeth 2212 are denoted as teeth 2122a, 2122b, 2122c, 2122d, 2122e, and 2122f in the order in which they are arranged in the circumferential direction, as shown in FIG. 4. Then, a conductor wire for the U phase is first wound around the tooth 2122a and then continuously wound around the tooth 2122d, with a portion of the conductor wire defining a passage line 223 passing between the teeth 2122a and 2122d. The passage line 223 is arranged axially above or below the core back portion 2211.

The upper bearing member 41 is preferably a ball bearing. An outer circumferential surface of the upper bearing member 41 is held by an inner circumferential surface of the core back portion 2211 of the stator core 221. The upper bearing member 41 is fixed to the core back portion 2211 of the stator core 221 through, for example, adhesion.

In the present preferred embodiment, an upper end surface of the core back portion 2211 is positioned axially above an upper end surface of the upper bearing member 41. Accordingly, even if any of the coils 222 wound on the teeth 2212 becomes loose to loosen a corresponding passage line 223, the loosened passage line 223 is unlikely to come into contact with the upper bearing member 41. In addition, when the upper bearing member 41 is fixed to the core back portion 2211 of the stator core 221, it is unlikely that any passage line 223 gets caught between the upper bearing member 41 and the core back portion 2211 of the stator core 221.

The circuit board 24, which includes a conductive pattern, a land, and electronic components, is mounted on the base portion 211 of the housing 21. The base portion 211 has a fastener hole 2111 with an upper opening, which is used to fix the circuit board 24. The circuit board 24 is fixed to the housing 21 by using a fastener which could be, for example, a screw. Each of the conductor wires forming the U, V, and W phases, respectively, drawn from the stator 22 is soldered to lands on the circuit board 24.

A fastener hole 2112 with a lower opening, which is used to attach the housing 21 to an apparatus, is preferably defined on a lower side of the base portion 211 of the housing 21. The housing 21 is fixed to the apparatus by using a fastener.

The shaft 31, which extends in the vertical direction along a rotation center axis and is arranged to rotate about the rotation center axis, is fixed to inner circumferential surfaces of the upper and lower bearing members 41 and 42. The shaft 31 is supported by the upper and lower bearing members 41 and 42 to be rotatable with respect to the housing 21. The shaft 31 is inserted inside the upper and lower bearing members 41 and 42, and preferably fixed thereto through, for example, an adhesive.

The rotor hub 32 as a whole is substantially in the shape of a cup, and includes a cylindrical magnet holding portion 321, a substantially flat bottom portion 322 extending radially inward from the magnet holding portion 321, and a cylindrical joining portion 323 extending axially downward from a central portion of the bottom portion 322. The rotor hub 32 is preferably made of a thin magnetic sheet and shaped by a stamping process, but any other material and forming process could be used if so desired. The joining portion 323 of the rotor hub 32 is fixed to the shaft 31 at a position higher than that at which the upper bearing member 41 is fixed to the shaft 31. The joining portion 323 of the rotor hub 32 is fixed to the shaft 31 through, for example, adhesion or press fitting or through a combination of adhesion and press fitting. The magnet holding portion 321 of the rotor hub 32 is arranged radially outward of the stator 22 to surround the stator 22.

The rotor magnet 33 is annular and fixed to an inner circumferential surface of the magnet holding portion 321 of the rotor hub 32. In the present preferred embodiment, the rotor magnet 33 is preferably defined by a ferrite rubber magnet, but any other desirable magnet type could be used if desired. The rotor magnet 33 is fixed to the rotor hub 32 through, for example, adhesion or press fitting or through a combination of adhesion and press fitting. The rotor hub 32 is arranged to serve as a yoke for the rotor magnet 33. The stator 22 and an inner circumferential surface of the rotor magnet 33 are arranged radially opposite each other with a gap provided therebetween. A lower surface of the rotor magnet 33 is arranged axially opposite an upper surface of the circuit board 24 with a gap therebetween.

Although not shown, the circuit board 24 preferably has three Hall elements arranged thereon to precisely detect rotation of the brushless motor 1, though any other desirable number of Hall elements could be used. Note that a pattern (i.e., an FG pattern) for frequency generation may be arranged on the circuit board 24 at a position opposite the lower surface of the rotor magnet 33, to improve the precision with which the rotation of the brushless motor 1 is detected.

When the brushless motor 1 is caused to rotate, a current is applied to the coils 222 of the stator 22 through the land of the circuit board 24. As a result, a magnetic field is generated around the coils 222, and this magnetic field and the rotor magnet 33 interact with each other to rotate the rotor magnet 33, the rotor hub 32, and the shaft 31.

Figure 3:
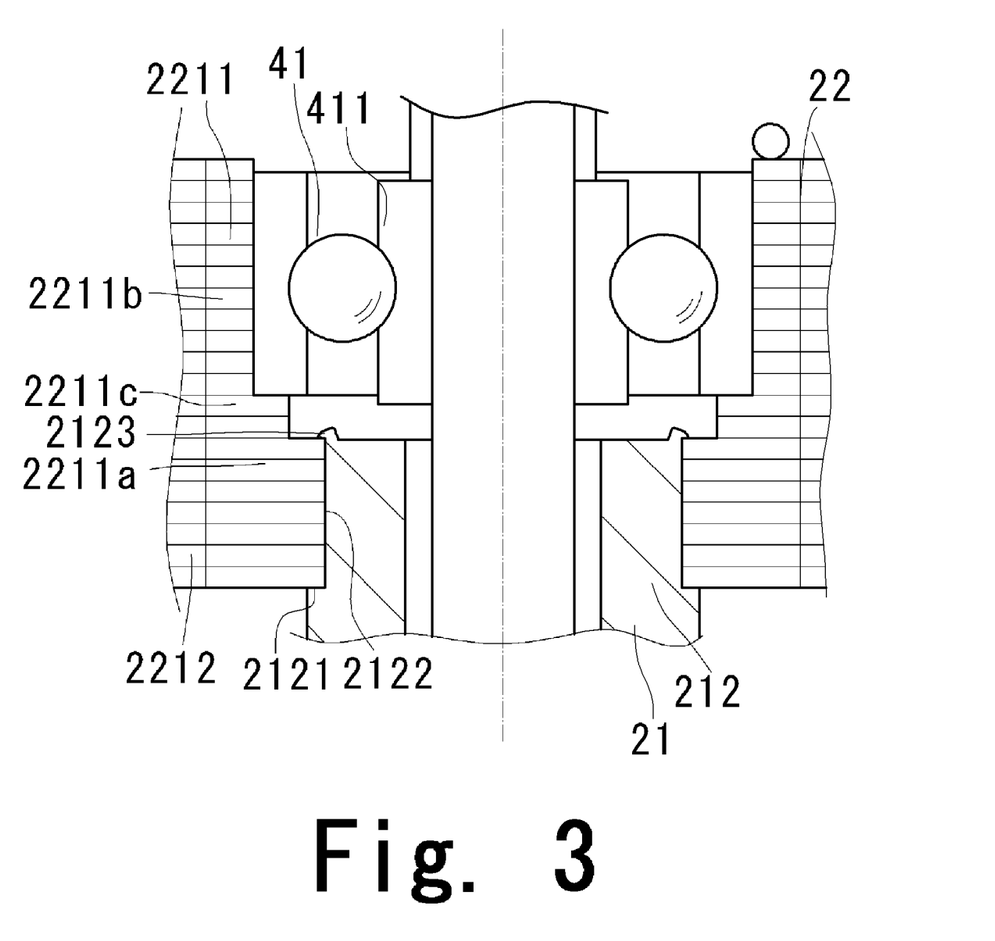
FIG. 3 is an enlarged diagram of a cylindrical portion of a housing of the brushless motor illustrated in FIG. 2 and its vicinity.

FIG. 3 is an enlarged diagram of the cylindrical portion 212 of the housing 21 of the brushless motor 1 illustrated in FIG. 2 and its vicinity. FIG. 4 is a plan view of the stator core 221 of the brushless motor 1 illustrated in FIG. 2. Referring to FIGS. 3 and 4, the inner circumferential surface of the core back portion 2211 of the stator 22 includes a small-diameter opening defining portion 2211a, a positioning portion 2211c positioned axially above the small-diameter opening defining portion 2211a, and a large-diameter opening defining portion 2211b positioned axially above the positioning portion 2211c.

Referring to FIG. 3, the cylindrical portion 212 of the housing 21 is arranged radially inside the small-diameter opening defining portion 2211a. An inner circumferential surface of the small-diameter opening defining portion 2211a is either arranged in contact with the cylindrical portion 212 of the housing 21, or arranged radially opposite the cylindrical portion 212 with a slight gap therebetween. An adhesive is preferably applied between the small-diameter opening defining portion 2211a and the cylindrical portion 212. The axial dimension of the small-diameter opening defining portion 2211a is substantially identical to the axial dimension of the stator opposing portion 2122 of the cylindrical portion 212.

A portion of an upper surface of the small-diameter opening defining portion 2211a is arranged in contact with a lower surface of the coming-off preventing portion 2123 to prevent the stator core 221 from coming off in an axially upward direction. In addition, a lower surface of the small-diameter opening defining portion 2211a is arranged in contact with the contact portion 2121 of the cylindrical portion 212. Thus, the small-diameter opening defining portion 2211a is held between the coming-off preventing portion 2123 and the contact portion 2121 of the housing 21 to achieve the joining of the housing 21 and the stator 22 by a structural method.

The positioning portion 2211c of the core back portion 2211 is arranged radially opposite the coming-off preventing portion 2123 of the housing 21. The large-diameter opening defining portion 2211b of the core back portion 2211 is arranged to hold the upper bearing member 41 inside it. Specifically, the upper bearing member 41 is inserted inside the large-diameter opening defining portion 2211b, and fixed thereto through an adhesive. Notice here that there is no need to arrange a portion of the housing 21 between the stator 22 and the upper bearing member 41, which makes it possible to achieve a corresponding increase in the diameter of the bearing member 4 without changing the dimensions of the teeth 2212 of the stator core 221.

Moreover, an upper end surface of the positioning portion 2211c and a lower end surface of the upper bearing member 41 are arranged in contact with each other to facilitate axial positioning of the upper bearing member 41 in relation to the stator 22 without the aid of a jig or any other member separate from the stator 22.

Furthermore, the axial dimension of the positioning portion 2211c is preferably greater than the axial dimension of the coming-off preventing portion 2123. This contributes to preventing the coming-off preventing portion 2123 from coming into contact with the upper bearing member 41.

In addition, the coming-off preventing portion 2123 is arranged radially outward of an inner race 411 of the upper bearing member 41. Accordingly, even if a preload, an external force, or the like causes the inner race 411 of the upper bearing member 41 to move axially downward, a contact of the inner race 411 of the upper bearing member 41 with the coming-off preventing portion 2123 is prevented.

Referring to FIG. 4, regarding the core back portion 2211 according to the present preferred embodiment, the radial position of an inner circumferential surface of the positioning portion 2211c is radially outward of the radial position of the inner circumferential surface of the small-diameter opening defining portion 2211a, and the radial position of an inner circumferential surface of the large-diameter opening defining portion 2211b is radially outward of the radial position of the inner circumferential surface of the positioning portion 2211c. On the other hand, the radial position of an outer circumferential surface of the core back portion 2211 (i.e., a boundary between the core back portion 2211 and the teeth 2212) is substantially identical across the entire axial extent of the core back portion 2211.

Therefore, the lack of the portion of the housing 21 between the large-diameter opening defining portion 2211b and the upper bearing member 41 makes it possible to secure a correspondingly greater radial space for the upper bearing member 41. This makes it possible to increase the outside diameter of the bearing member without the need to decrease the radial dimension of the teeth 2212 of the stator core 221.

Figure 5:
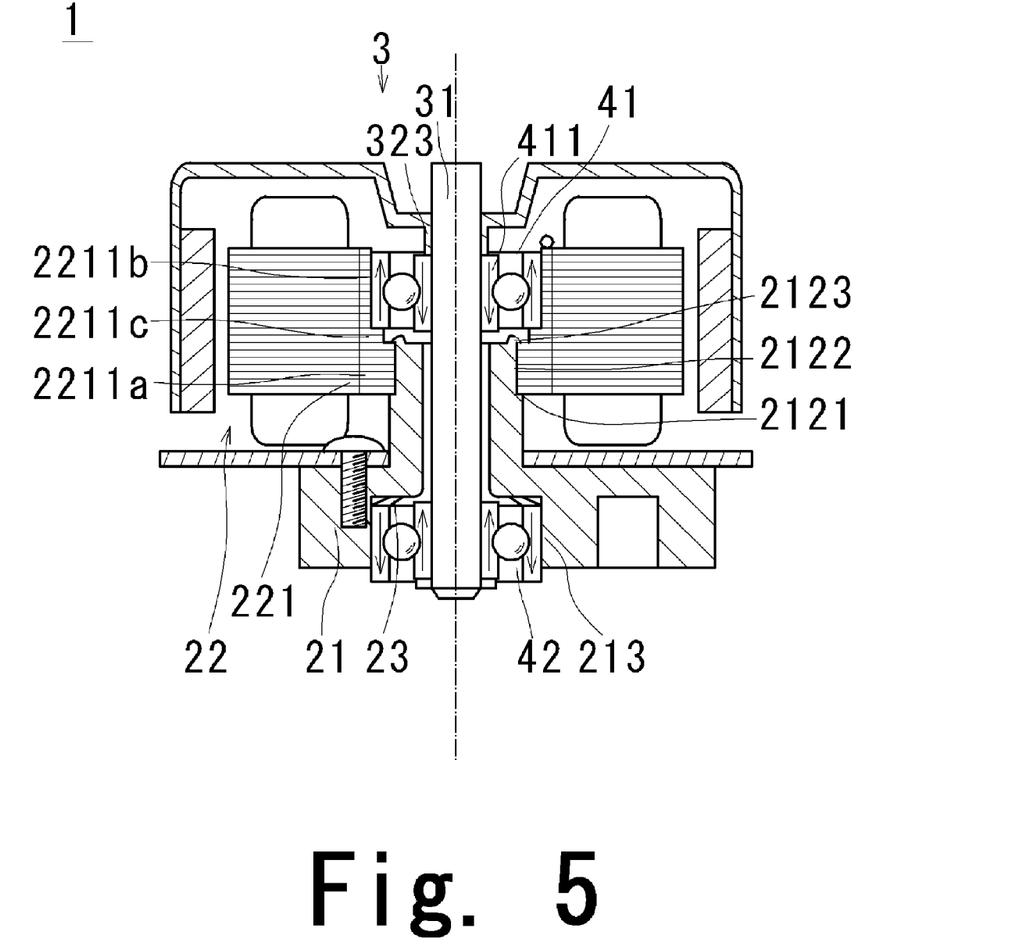
FIG. 5 is a schematic diagram illustrating preloads applied to ball bearings of the brushless motor illustrated in FIG. 2.

FIG. 5 is a schematic diagram illustrating preloads preferably applied to the ball bearings of the brushless motor 1 according to the present preferred embodiment. An example of a procedure for assembling the brushless motor 1 according to the present preferred embodiment and a mechanism by which the preloads are applied to the ball bearings will now be described below. Referring to FIG. 5, first, the stator 22, the housing 21, the upper bearing member 41, the lower bearing member 42, and the rotating portion 3 are prepared.

Next, the adhesive is applied to the inner circumferential surface of the small-diameter opening defining portion 2211a of the stator core 221 or the stator opposing portion 2122 of the housing 21. Thereafter, the cylindrical portion 212 of the housing 21 is inserted inside the stator core 221 so that the small-diameter opening defining portion 2211a of the stator core 221 is fitted to the stator opposing portion 2122 of the housing 21. As a result of this insertion and the fitting of the small-diameter opening defining portion 2211a to the stator opposing portion 2122 after the aforementioned application of the adhesive, the adhesive spreads throughout between the stator opposing portion 2122 and the small-diameter opening defining portion 2211a.

The cylindrical portion 212 of the housing 21 is inserted into the stator core 221 until a lower end surface of the small-diameter opening defining portion 2211a is brought into contact with the contact portion 2121 of the housing 21, so that the axial positioning of the stator 22 is achieved. Note that, in this stage, the radial position of the coming-off preventing portion 2123 is radially inward of the radial position of the small-diameter opening defining portion 2211a.

Next, the positional relationship between the stator 22 and the housing 21 is adjusted to cause the stator 22 and the housing 21 to be coaxial with each other. Then in this state, the coming-off preventing portion 2123 is plastically deformed radially outward to swage the housing 21 and the stator 22 together. More specifically, the coming-off preventing portion 2123 has a plurality of portions spaced from one another in the circumferential direction, and these portions are plastically deformed to swage the housing 21 and the stator 22 together (so-called point swaging). This enables the stator 22 and the housing 21 to be coaxial with each other more precisely than when the stator 22 and the housing 21 are fixed to each other through press fitting. Moreover, the combination of adhesion and swaging ensures the joining of the stator 22 and the housing 21. In particular, since the small-diameter opening defining portion 2211*a* is held between the coming-off preventing portion 2123 and the contact portion 2121 of the housing 21, the joining of the housing 21 and the stator 22 is achieved by a structural method.

Further, the adhesive is applied to the outer circumferential surface of the upper bearing member 41. Then, the upper bearing member 41 is inserted inside the large-diameter opening defining portion 2211*b* of the stator 22 until an axially lower end of the upper bearing member 41 is brought into contact with the positioning portion 2211*c* of the stator 22. As a result, the axial positioning of the upper bearing member 41 in relation to the stator 22 is achieved.

Next, the shaft 31 of the rotating portion 3 is inserted inside the upper bearing member 41 until a lower surface of the joining portion 323 of the rotor hub 32 of the rotation portion 3 is brought into contact with an upper surface of the inner race 411 of the upper bearing member 41. As a result, the joining portion 323 is supported on the inner race 411 of the upper bearing member 41 to press the inner race 411 downward, so that the preload is applied to the inner race 411 of the upper bearing member 41. Here, the coming-off preventing portion 2123 is positioned radially outward of the inner race 411 of the upper bearing member 41. Therefore, even if the inner race 411 of the upper bearing member 41 is moved axially downward in this step, a contact of the inner race 411 of the upper bearing member 41 with the coming-off preventing portion 2123 is prevented.

Then, the preload spring 23 is arranged inside the accommodating portion 213 of the base portion 211 of the housing 21. Then, the lower bearing member 42 is inserted inside the accommodating portion 213 from below the shaft 31. Before this insertion, the adhesive may be applied to an inner circumferential surface of the accommodating portion 213 or an outer circumferential surface of the lower bearing member 42 so that the insertion of the lower bearing member 42 will cause the adhesive to spread throughout between the inner circumferential surface of the accommodating portion 213 and the outer circumferential surface of the lower bearing member 42.

As illustrated in FIG. 5, the application of the preloads to the bearing members defined by the ball bearings is ensured in the above-described manners.

Figure 6:
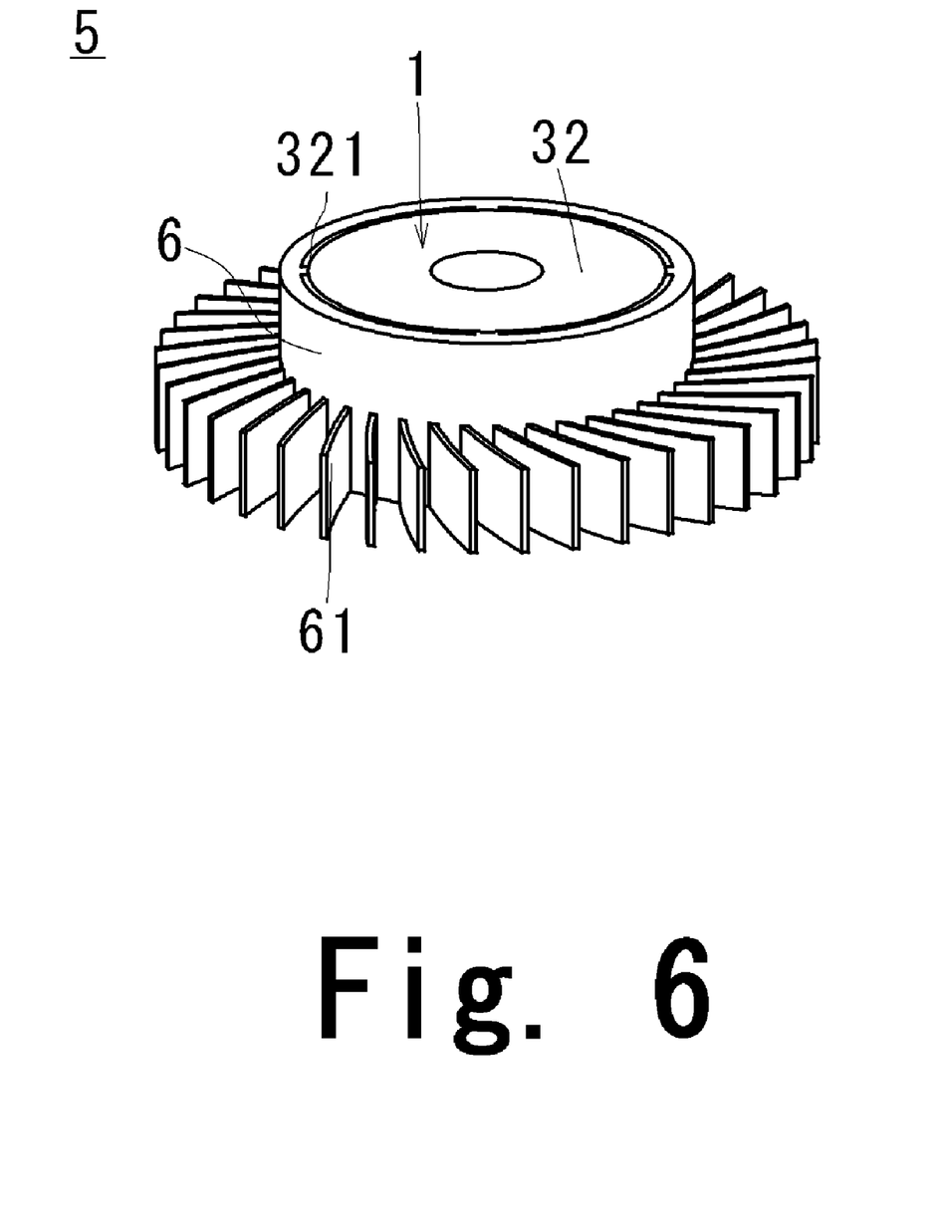
FIG. 6 is a perspective view of a blower in which the brushless motor according to a preferred embodiment of the present invention is used.

FIG. 6 illustrates an example of a blower 5 in which the brushless motor 1 according to one of the above-described preferred embodiments of the present invention may be used. Referring to FIG. 6, a cylindrical fan member 6 having an impeller 61 with a plurality of blades arranged on an outer circumference thereof is fixed to an outer circumferential surface of the magnet holding portion 321 of the rotor hub 32 through the combination of adhesion and press fitting, or by using any other desirable manufacturing method. The blower 5, in which the brushless motor 1 according to one of the above-described preferred embodiments of the present invention is used, uses the ball bearings of a greater diameter than the outside diameter of the stator core 221, and is therefore highly reliable, and is capable of having a wide air-blowing space and being installed in a small-size apparatus. Moreover, the blower 5 is allowed to have excellent rotation properties because the stator 22 is allowed to have a sufficient winding space.

While preferred embodiments of the present invention have been described above, it is to be understood by those skilled in the art that variations and modifications are possible without departing from the scope and spirit of the present invention.

For example, in the above-described preferred embodiments, the housing 21 is preferably produced by die casting. Note, however, that this is not essential to the present invention, and that the housing 21 may be produced by other methods including, for example, a cutting process, press working, or the like in other preferred embodiments.

Moreover, in the above-described preferred embodiments, the housing 21 is made of a zinc alloy. Note, however, that this is not essential to the present invention, and that the housing 21 may be made of another material, such as, for example, an aluminum alloy, brass, or the like in other preferred embodiments.

Furthermore, in the above-described preferred embodiments, the rotor hub 32 is made of a thin magnetic sheet. Note, however, that this is not essential to the present invention, and that the rotor hub 32 may be made of a non-magnetic material, such as, for example, an aluminum material, a resin material, or the like in other preferred embodiments. In this case, however, it is necessary to provide an additional member which is separate from the rotor hub 32 and serves as the yoke for the rotor magnet 33.

Furthermore, in the above-described preferred embodiments, the ball bearings are used as the bearing member 4. Note, however, that this is not essential to the present invention, and that, for example, an oil-impregnated sintered bearing or the like may be used as the bearing member 4. In the case where the oil-impregnated sintered bearing is used as the bearing member 4, the bearing member 4 is arranged radially opposite the shaft 31 with a slight gap therebetween, and a coming-off preventing member (not shown) is fixed to the shaft 31 to prevent the shaft 31 from coming off in an axial direction.

Furthermore, in the above-described preferred embodiments, the coming-off preventing portion 2123 has a plurality of portions spaced from one another in the circumferential direction, and these portions are plastically deformed to swage the housing 21 and the stator 22 together (the so-called point swaging). Note, however, that this is not essential to the present invention, and that the coming-off preventing portion 2123 may be plastically deformed radially outward in the entire circumference, for example, to swage the housing 21 and the stator 22 together in other preferred embodiments. Also note that only a single portion of the coming-off preventing portion 2123 may be plastically deformed to achieve the point swaging in other preferred embodiments.

Figure 7:
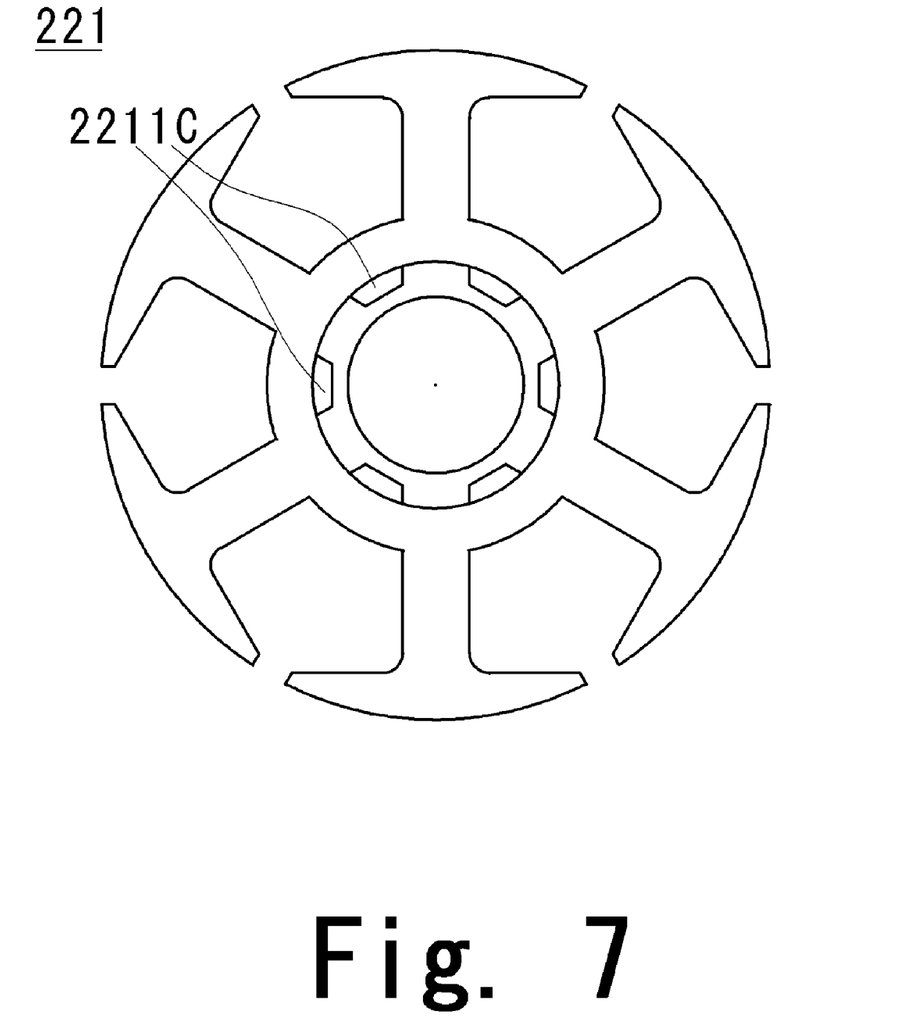
FIG. 7 is a plan view of a stator of a brushless motor according to yet another preferred embodiment of the present invention.

Furthermore, in the above-described preferred embodiments, the positioning portion 2211*c* is annular in shape. Note, however, that this is not essential to the present invention, and that, referring to FIG. 7, the positioning portion 2211*c* may not necessarily extend around the entire circumference in other preferred embodiments. In this case, the coming-off preventing portion 2123, or the plurality of portions thereof spaced from one another in the circumferential direction, may be arranged at a circumferential position(s) at which no portion of the positioning portion 2211c is provided. This will increase the area where the coming-off preventing portion 2123 and the small-diameter opening defining portion 2211a are in contact with each other, resulting in more secure joining of the stator 22 and the housing 21. Note that, in the case where the positioning portion 2211c does not extend around the entire circumference, an inner radial end of the positioning portion 2211c and the inner circumferential surface of the small-diameter opening defining portion 2211a may be equally distant from the rotation center axis.

Figure 8:
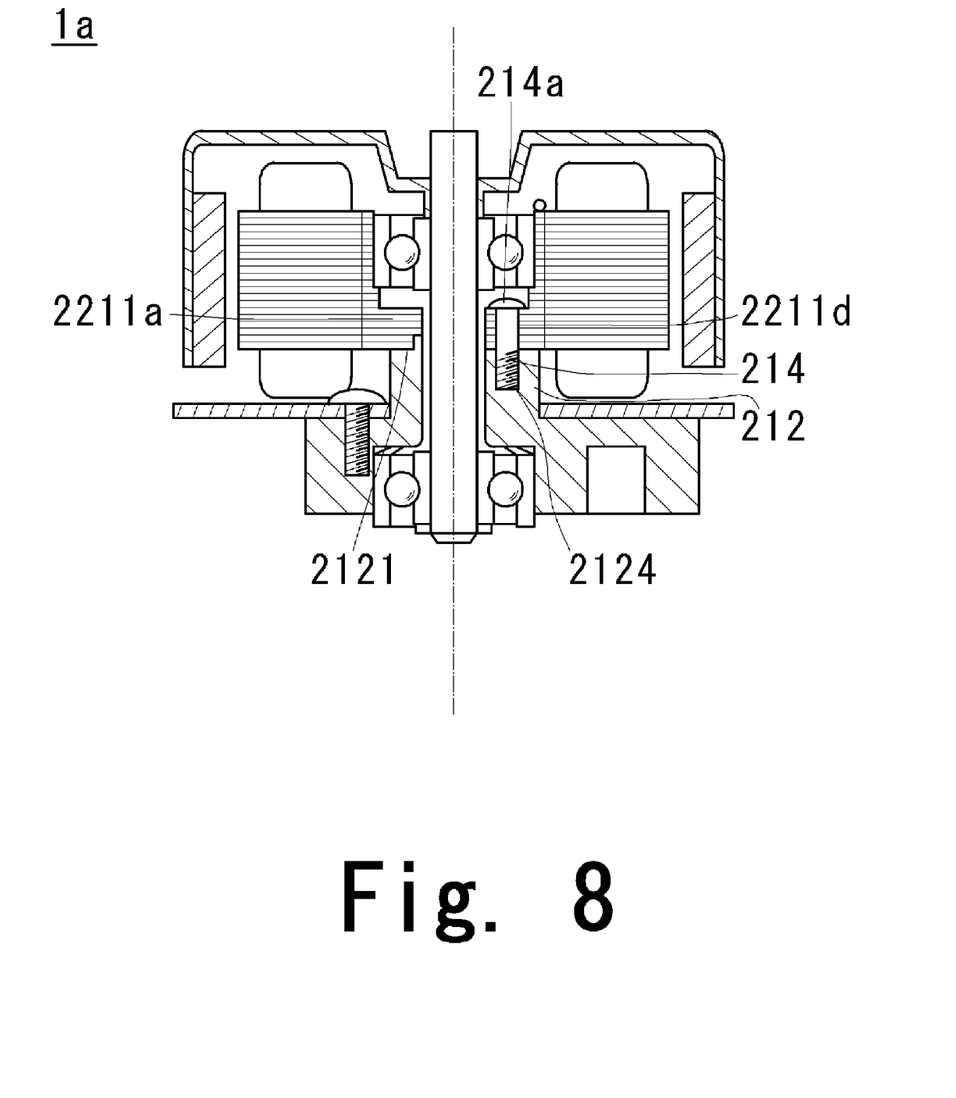
FIG. 8 is a cross-sectional view of a brushless motor according to yet another preferred embodiment of the present invention.

Furthermore, in the above-described preferred embodiments, the stator 22 and the housing 21 are preferably fixed to each other through the swaging process. Note, however, that this is not essential to the present invention. For example, referring to FIG. 8, in a brushless motor 1a according to another preferred embodiment of the present invention, a screw 214 may be used to join the stator 22 and the housing 21 to each other. In this case, the stator 22 is held on the housing 21, and the contact portion 2121 and a hole 2124 recessed axially downward from the contact portion 2121 are defined on an upper surface of the cylindrical portion 212. In addition, the small-diameter opening defining portion 2211a of the stator core 221 includes a screw insertion portion 2211d defined by an axial through hole or a radially outward recess on the inner circumferential surface of the small-diameter opening defining portion 2211a. The screw 214 is inserted through the screw insertion portion 2211d and, screwed into the hole 2124, so that threads of the screw 214 and grooves arranged on an inner circumferential surface of the hole 2124 are engaged with each other. As a result, a lower surface of the core back portion 2211 is brought into contact with the contact portion 2121, and the core back portion 2211 is fixed thereto with the upper surface of the small-diameter opening defining portion 2211a in contact with a screw head 214a (which corresponds to the coming-off preventing portion). The stator 22 and the housing 21 may be fixed to each other in the above-described manner.

Furthermore, in the above-described preferred embodiments, the contact portion 2121 is defined by a radially expanding flat surface. Note, however, that this is not essential to the present invention. In other preferred embodiments, the contact portion 2121 may be in any shape as long as at least a portion of the contact portion 2121 is arranged in contact with a portion of a lower surface of the stator core 221, regardless of whether this portion is a portion of the small-diameter opening defining portion 2211a or not.

Furthermore, in the above-described preferred embodiments, the insulation between the stator core 221 and the coils 222 is achieved by insulation coating. Note, however, that this is not essential to the present invention. For example, an insulator may be used to ensure the insulation between the stator core 221 and the coils 222 in other preferred embodiments.

Furthermore, in the above-described preferred embodiments, the upper and lower bearing members 41 and 42 have the same diameter. Note, however, that this is not essential to the present invention. The lower bearing member 42 may have a greater diameter than that of the upper bearing member 41 in other preferred embodiments. Conversely, the upper bearing member 41 may have a greater diameter than that of the lower bearing member 42 in other preferred embodiments.

Furthermore, in the above-described preferred embodiments, the upper end surface of the core back portion 2211 is positioned axially above the upper end surface of the upper bearing member 41. Note, however, that this is not essential to the present invention, as long as at least a portion of the upper bearing member 41 is held by the large-diameter opening defining portion 2211b of the core back portion 2211.

Furthermore, in the above-described preferred embodiments, the adhesive is applied between the stator core 221 and the upper bearing member 41. Note, however, that this is not essential to the present invention. A heat-insulating material may be arranged between the stator core 221 and the upper bearing member 41 in other preferred embodiments. The provision of the heat-insulating material between the stator core 221 and the upper bearing member 41 hinders the transfer of heat generated in the stator 22 to the upper bearing member 41, and contributes to lengthening the life of the upper bearing member 41.

Furthermore, the brushless motor 1 according to the above-described preferred embodiments is applied to the blower 5. Note, however, that this is not essential to the present invention. For example, brushless motors according to other preferred embodiments may be structured such that, as illustrated in FIG. 1, the shaft 31 is elongated in the axial direction, and that a component used to transfer power to an outside of the motor, such as a gear or a pulley, is provided at an end of the shaft 31, and be used as a main motor of an office automation appliance or the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. A brushless motor comprising:
 a shaft extending in a vertical direction along a rotation center axis, and arranged to rotate about the rotation center axis;
 a bearing member arranged to rotatably support the shaft;
 a rotor hub in a shape of a cup with a downward opening, and arranged to join together with the shaft;
 a rotor magnet arranged radially inside the rotor hub;
 a stator arranged radially inward of the rotor magnet and opposite the rotor magnet with a gap defined therebetween; and
 a housing including a cylindrical portion, wherein said stator is position radially outside of said cylindrical portion; wherein
 the stator includes an annular core back portion, a plurality of teeth extending radially outward from an outer circumference of the core back portion, and coils defined by a conductor wire wound around a separate one of the teeth;
 the cylindrical portion includes a contact portion and a coming-off preventing portion arranged above the contact portion on an outer circumference of the cylindrical portion;
 the core back portion includes a small-diameter opening defining portion and a large-diameter opening defining portion arranged above the small-diameter opening defining portion;
 the cylindrical portion is arranged radially inward of the core back portion;
 the stator is supported by the cylindrical portion with a lower surface of the core back portion arranged in contact with the contact portion and an upper surface of the small-diameter opening defining portion arranged in contact with the coming-off preventing portion;
 the bearing member is arranged radially inside the large-diameter opening defining portion; and the bearing member is arranged above the coming-off preventing portion.

2. The brushless motor according to claim 1, further comprising a positioning portion arranged between the large-diameter opening defining portion and the small-diameter opening defining portion to position the bearing member, wherein the bearing member is a ball bearing; and an upper end surface of the positioning portion is arranged in contact with a lower surface of the bearing member.

3. The brushless motor according to claim 2, wherein the positioning portion is defined by a portion of the stator.

4. The brushless motor according to claim 2, wherein an inner edge of the positioning portion includes a first section and a second section, the second section being more distant from the rotation center axis than the first section; and the coming-off preventing portion includes a portion arranged radially outward of the first section.

5. The brushless motor according to claim 2, wherein the rotor hub includes a bottom portion and a joining portion extending axially downward from a radially inner edge of the bottom portion, the radially inner edge being arranged at a central portion of the bottom portion;

an inner circumferential surface of the joining portion is joined to the shaft; and a lower surface of the joining portion is arranged in contact with an upper surface of the bearing member.

6. The brushless motor according to claim 5, further comprising a lower bearing member, wherein the housing further includes an accommodating portion arranged below the cylindrical portion to accommodate a lower bearing member; and the accommodating portion includes a preload spring arranged above the lower bearing member.

* * * * *